United States Patent [19]
Denny

[11] Patent Number: 6,039,141
[45] Date of Patent: Mar. 21, 2000

[54] MOVING OPERATOR AND DISPLAY UNIT

[75] Inventor: Thomas M. Denny, Lemont, Ill.

[73] Assignee: Case Corporation, Racine, Wis.

[21] Appl. No.: 09/027,538

[22] Filed: Feb. 23, 1998

[51] Int. Cl.[7] .................................................. B60K 26/00
[52] U.S. Cl. .................. 180/329; 180/89.12; 296/190.01
[58] Field of Search .................................... 180/324, 326, 180/329, 334, 89.12; 296/190.01

[56] References Cited

U.S. PATENT DOCUMENTS

| | | | |
|---|---|---|---|
| 4,392,546 | 7/1983 | Brown et al. | 180/326 |
| 5,086,869 | 2/1992 | Newbery et al. | 180/329 |
| 5,567,004 | 10/1996 | Pietzsch | 296/190 |
| 5,666,793 | 9/1997 | Bottinger | 56/10.2 R |
| 5,887,669 | 3/1999 | Ostler et al. | 180/53.4 |

OTHER PUBLICATIONS

1997 Case Corporation Brochure, Excerpts from brochure entitled "Magnum: 8900 Series"; 5 pages.

*Primary Examiner*—Paul N. Dickson
*Attorney, Agent, or Firm*—Foley & Lardner

[57] ABSTRACT

An improved seating and instrumentation arrangement for an off-road vehicle such as a tractor, combine or excavator is disclosed herein. The arrangement includes a seat having an armrest attached thereto. Attached to the armrest is a electronic display for displaying information to the vehicle operator. The armrest also includes controls elements (e.g. throttle control, gear selector, height adjustments, slip control, hydraulic controls, power take-off control, etc.) which the operator manipulates to control vehicle and implement operation. The seat is moveable upon the vehicle to conform to a particular operator's positioning preferences, to respond to shock and vibrations and to permit the operator to rotate the seat to view vehicle components or operations which are substantially out of the line of sight of the operator when facing forward relative to the vehicle. This arrangement permits the operator to maintain visual contact with the electronic display and access to the control elements when the seat moves or is rotated from its normal (forward) operating position.

36 Claims, 5 Drawing Sheets

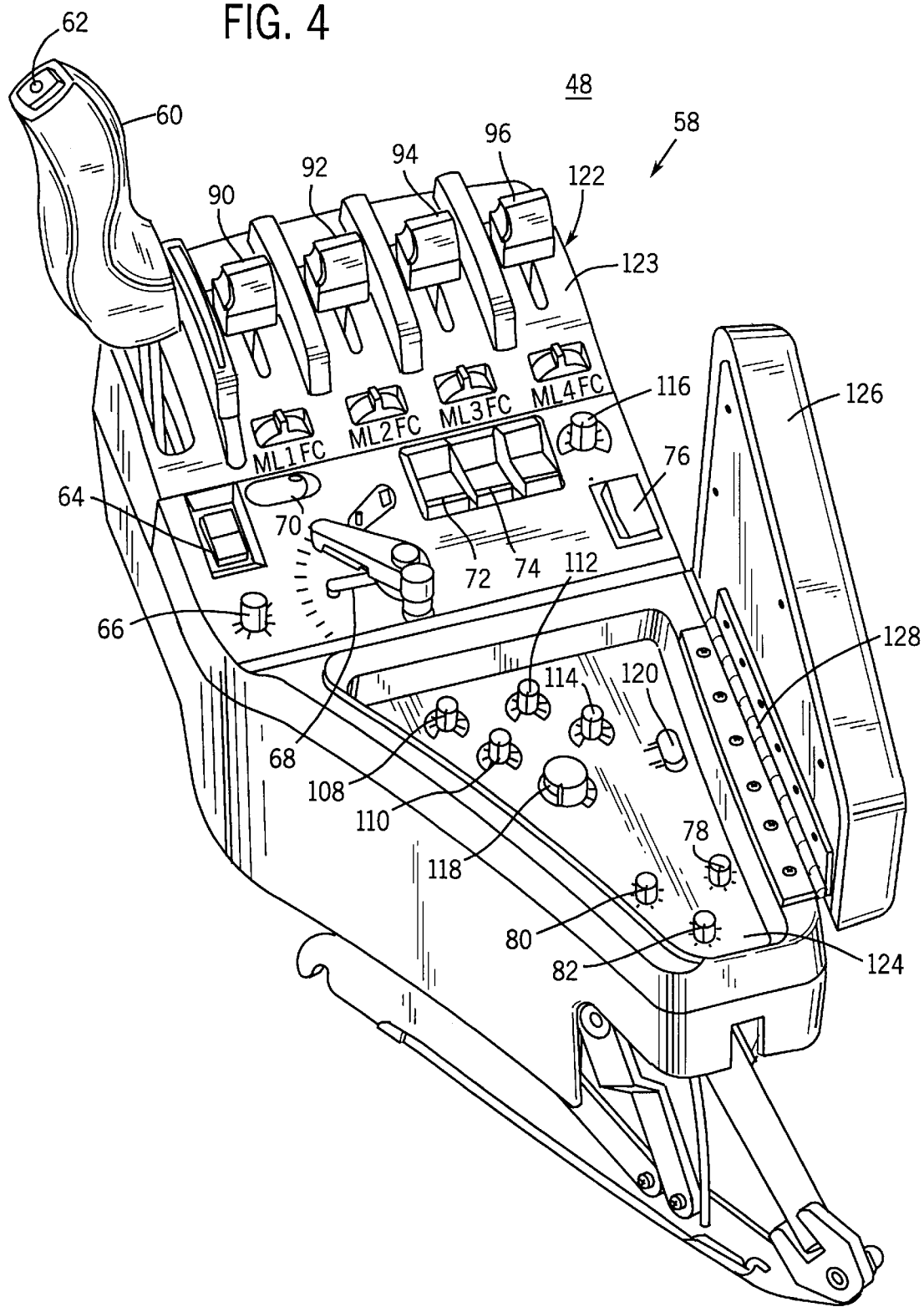

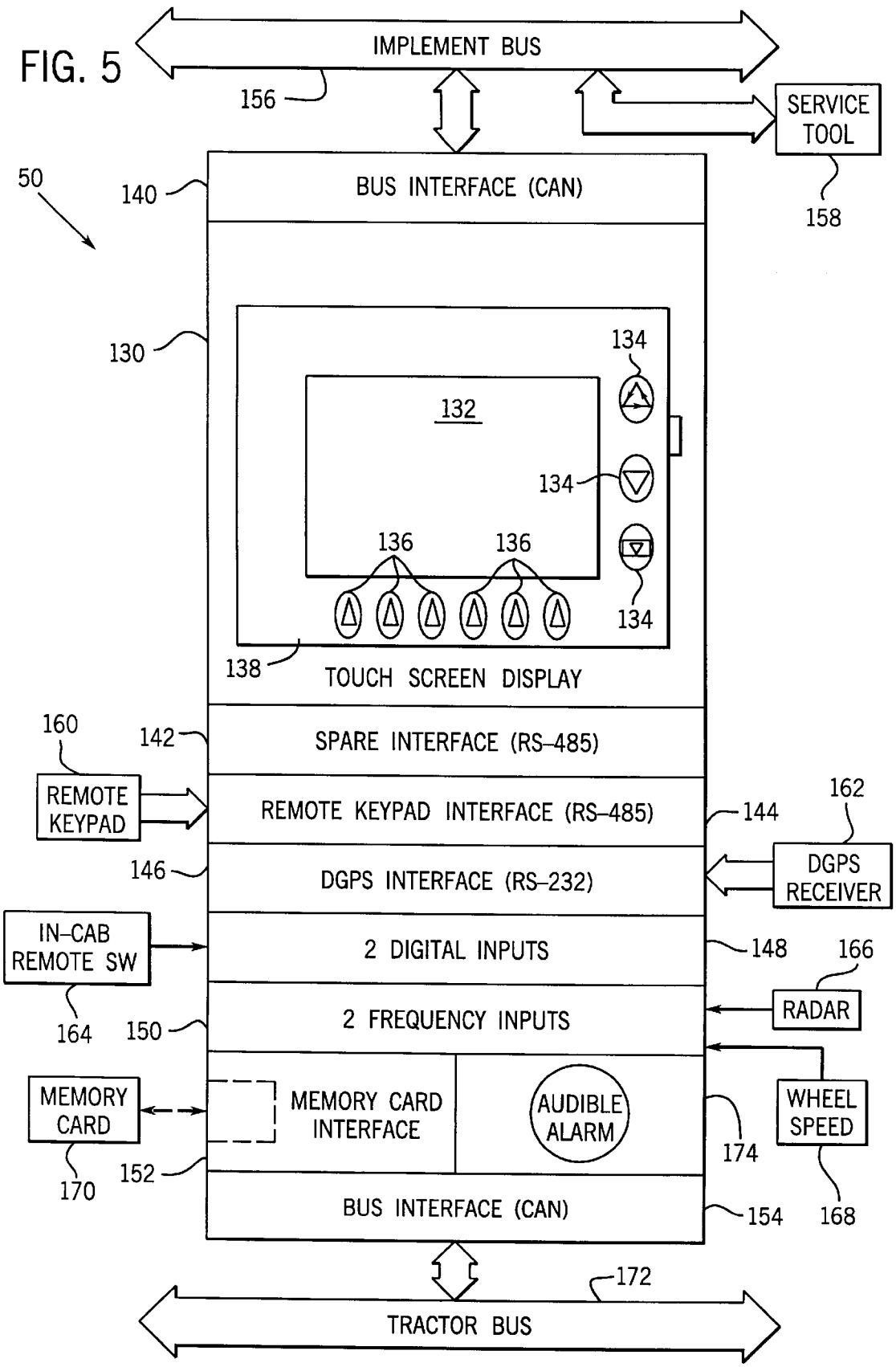

MOVING OPERATOR AND DISPLAY UNIT

FIELD OF THE INVENTION

The present invention relates to the operator station for an off-road vehicle such as a combine, tractor or excavator. In particular, the present invention provides a moving operator seat having an armrest which supports an instrument cluster and an electronic display for displaying vehicle information.

BACKGROUND OF THE INVENTION

The performance of off-road vehicles such as combines, tractors and excavator has been greatly advanced through the use of electronic controls for the vehicle functions, improved operator feedback, and improved operator instrumentation. For example, microprocessor based electronic controls are used for hitch positioning, engine control, slip control, combine rotor control, combine feed control, excavator bucket control and backhoe control to list a few. This type of control has improved the performance of equipment which in the past has been primarily mechanically controlled. However, as a result, operators now have more operation variables to be aware of and control.

To improve the operator's ability to monitor vehicle parameters and variables such as hitch position, engine speed, slip rate, rotor speed, feed rates, vehicle speed, vehicle position (e.g. global position), bucket orientation, seed rates, etc., electronic displays are being used to provide information to the operator. These displays typically have a stationary position within the operator cab. Additionally, to improve operator control, instrumentation for control is typically located upon an armrest of the operators chair of the seat. This arrangement permits the operator to provide the majority of controlled vehicle parameters with a single hand so that the operator's other hand is free to operate the vehicle steering system.

One of the problems with the present positioning and mounting of electronic displays is that they are stationary and not readily viewable by the operator when the operator swivels or pivots his or her chair to observe operations of the vehicle in a direction other than the forward direction of the vehicle. For example, when operating the equipment associated with a tractor or combine, the operator will frequently swivel his or her chair to view the operation of the equipment from the rear or side of the vehicle. Depending upon the vehicle this same type of problem may exist for instrumentation which is stationary and not readily accessible by the operator when the operator swivels his chair to observe operations of the vehicle in a direction other than the forward direction of the vehicle.

Another problem associated with the present positioning and mounting of electronic displays is that because the electronic displays are stationary, movement of the operator's chair to conform to the particular operator's positioning preferences as well as to respond to shock and vibrations constantly changes the operator's line of site to the electronic display. As a result, it is difficult for the operator to steadily focus on the visual information provided by the electronic display. In addition, the constant relative movement between the electronic display and the operator's chair also constantly changes the distance between the operator and the particular controls on the electronic display. The constantly changing distance between the operator and the electronic display reduce the operator's ability to quickly and accurately control and manipulate controls of the electronic display.

As a result of the conventional, stationary mounting arrangements for displays and instrumentation, operators may be required to pivot back and forth to observe an operation while also taking into account displayed information and/or operating the associated instrumentation. Accordingly, it would be desirable to provide the operator with an improved operator station which permits operator movement within the station so that the operator maintains a relatively direct line of sight to the display and access to instrumentation and controls during movement.

SUMMARY OF THE INVENTION

One embodiment of the present invention provides an operator station for a vehicle. The station includes a seat, at least one operator-controlled device and an electronic display. The seat is supported by a support for movement relative to the vehicle. The operator-controlled device and the electronic display move with the seat. Thus, the operator can move in the seat and maintain a line of sight to the electronic display. Furthermore, the operator can maintain hand contact with the operator-controlled device while moving the seat.

Another embodiment of the operator station includes an operator seat upon which an operator of the vehicle can be seated, pivot means for rotatably supporting the operator seat on the vehicle, and control means for generating an electronic control signal utilized to control a function associated with the vehicle. The station also includes display means for generating an image viewable by an operator located on the seat. The control means and display means are supported on the vehicle by the pivot means.

The present invention may also be embodied in an off-road vehicle of the type including an operator station supported by the vehicle frame, an implement supported by the frame, a transducer couple to the implement to generate signals representative of at least one operating characteristic of the implement, and an actuator coupled to the implement and operable to control an operating parameter of the implement in response to a control signal. The vehicle also includes an operator seat with at least one armrest, a pivot support attached between the operator seat and the frame to permit rotation of the seat relative to the vehicle, and at least one electronic, operator-controllable device supported by at the armrest. The armrest also supports an electronic display, wherein the display is configured to generate images thereon for viewing by an operator located on the seat, and the operator-controllable device generates an electronic signal utilized to generate the control signal.

BRIEF DESCRIPTION OF THE DRAWINGS

FIG. 4 is an enlarged fragmentary perspective view of the armrest control unit of FIG. 3.

FIG. 5 is a diagrammatic view of the control and display unit of FIG. 3.

DETAILED DESCRIPTION OF THE PREFERRED EMBODIMENTS

Figure 1:
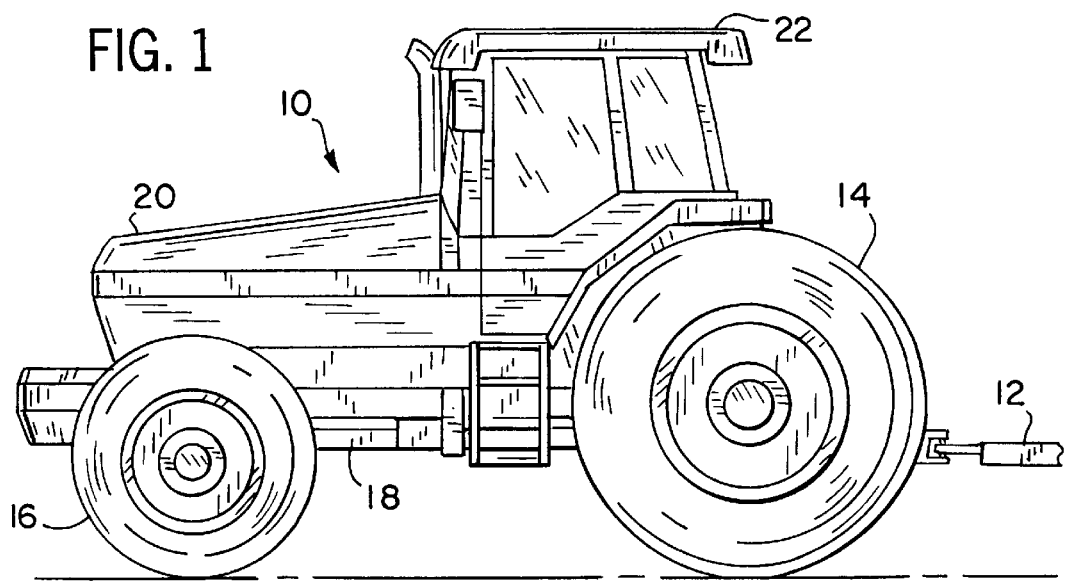
FIG. 1 is a side elevational view of an off-road vehicle pulling an implement.

FIG. 1 is a side elevational view illustrating off-road vehicle 10 pulling implement 12. In the embodiment illustrated, vehicle 10 comprises a tractor configured for pulling implement 12. Vehicle 10 generally includes rear wheels 14, front wheels 16, frame 18, body 20 and cab 22. As conventionally known, rear wheels 14, front wheels 16 and frame 18 are operably interconnected to form a chassis of vehicle 10. Body 20 and cab 22 mount upon the chassis. Body 20 includes the engine, hydraulic systems and electronic systems of vehicle 10. Cab 22 houses and encloses operator station 24 (shown in FIG. 3). As can be appreciated, cab 22 may be removable, omitted or replaced by a roll bar or other operator protecting structures. As can further be appreciated, vehicle 10 may have any one of a variety of alternative configurations. For example, vehicle 10 may include conventionally known tracks in lieu of wheels 14, 16 and may alternatively include various other attachments.

Figure 2:
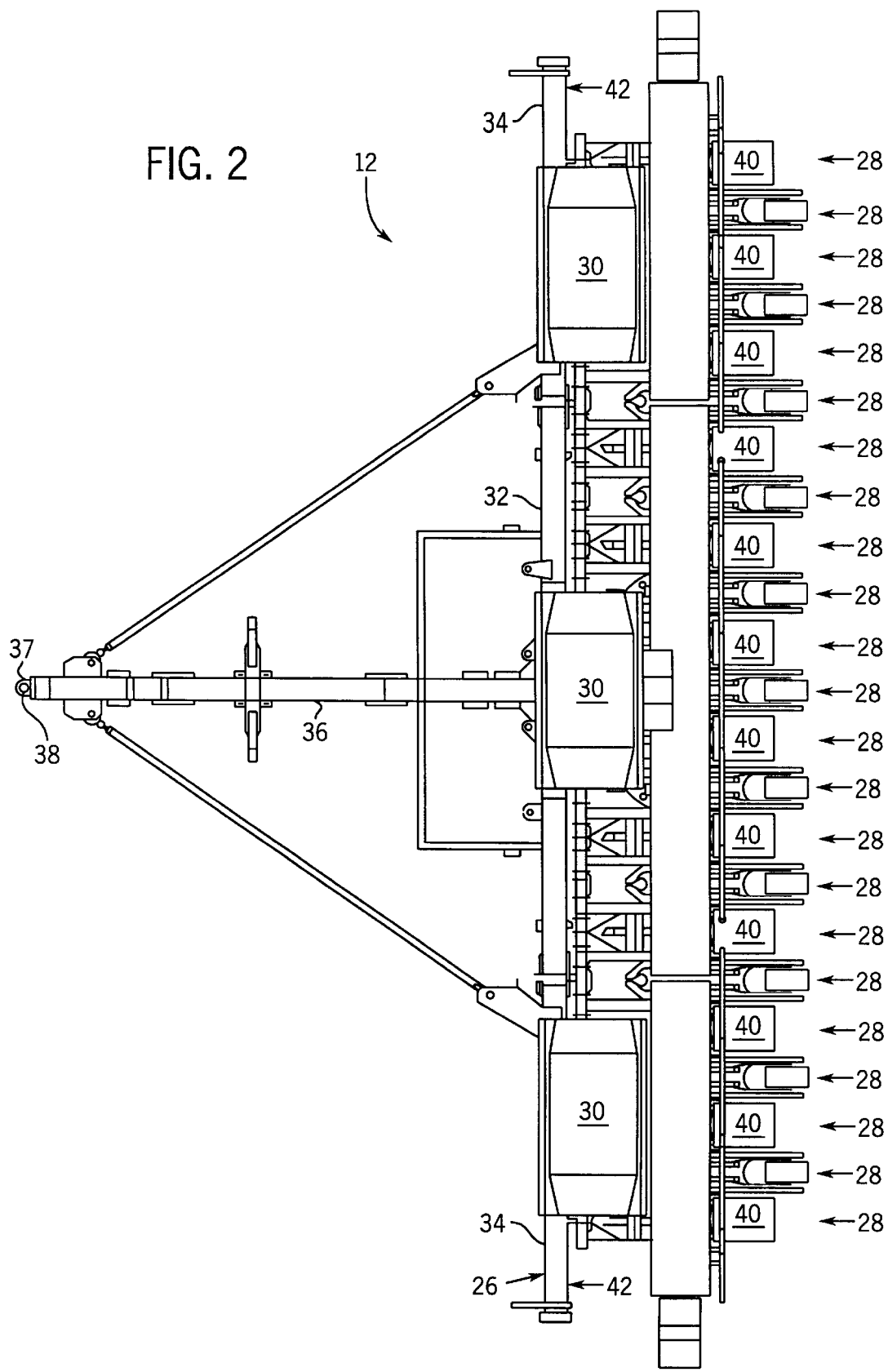
FIG. 2 is a top elevational view of the implement of FIG. 1.

Implement 12 is illustrated in greater detail in FIG. 2. Implement 12 preferably comprises a conventionally known planting implement such as a 12/23 SRC CYCLO Planter as further illustrated and described in greater detail in co-pending U.S. patent application Ser. No. 08/935,997 (hereby incorporated by reference). Implement 12 generally includes a support structure such as a frame 26, row units 28 mounted beneath the frame 26, and seed modules 30 supported by frame 26. Frame 26 includes a middle section 32, wing sections 34 on either side of section 32, and a draw bar 36 extending forward from section 32. Wing sections 34 rotate inwardly toward draw bar 36 to decrease implement width during transport. A hitch 37 having an eye 38 is attached to draw bar 36 and connects implement 12 to vehicle 10 (shown in FIG. 1). Preferably, implement 12 includes twenty-three row units 28 configured to plant seed in twenty-three rows of a field with all row units 28 down, or to plant 12 rows with every other row unit 28 locked up. Each module 30 meter seeds for row units 28 in one section. Metered seeds are delivered through seed tubes (not shown) from sections 32 to row units 28. Bins 40 storing other products (e.g., fertilizer, insecticide or herbicide) and metering devices therefor, are also supported by frame 26. Markers are attached to either side 42 of frame 26 and mark the center line of the next pass through a field.

To monitor the operation of planting implement 12, it is important that the operator at operator station 24 maintain visual contact with implement 12. At the same time, it is also important that the operator maintain visual contact with the forward end of vehicle 10 in control of the steering and implement controls at operator station 24. Operator station 24 enables the operator to meet these requirements.

Figure 3:
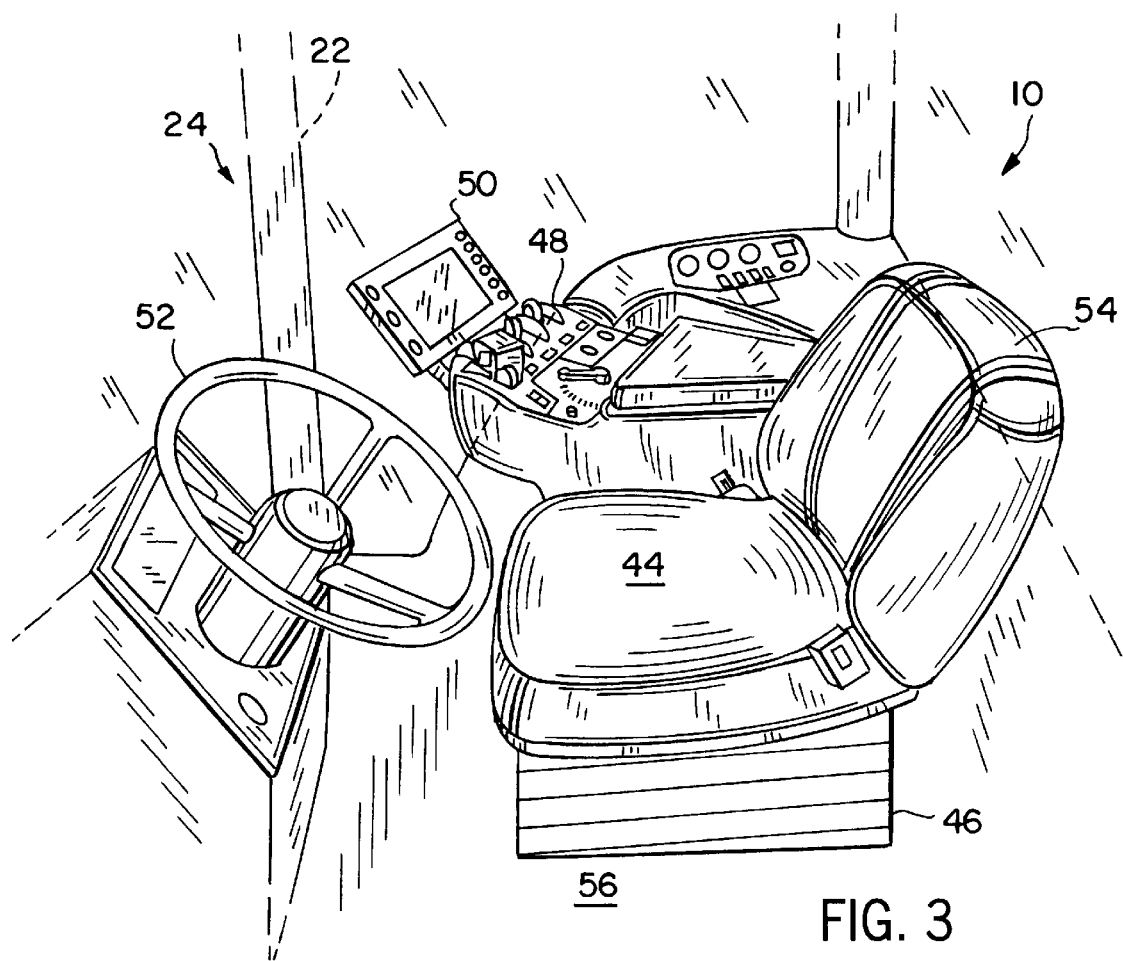
FIG. 3 is a fragmentary perspective view of the vehicle of FIG. 1 illustrating an operator station embodying the present invention and including a seat, an armrest control unit, and a control and display unit.

FIG. 3 is a fragmentary perspective view illustrating operator station 24 housed within cab 22. As best shown by FIG. 3, operator station 24 generally includes seat 44, seat support 46, armrest control unit 48, control and display unit 50 and steering control 52. Seat 44 is configured for seating an operator of vehicle 10. In the embodiment illustrated, seat 44 includes a back rest 54 configured to seat the operator in a generally forward-facing seated position. Seat 44 is movably attached to vehicle 10 by seat support 46.

Seat support 46 is attached to seat 44 and armrest control unit 48 and is configured for being coupled to floor 56 of vehicle 10. Support 46 is conventionally known and enables seat 44 to pivot or rotate about a vertical axis and a horizontal axis, to move frontward and rearward, and to move sideways. Support 46 also includes shock-absorbing mechanisms for providing the operator a smooth and comfortable ride. Support 46 preferably enables an operator to make multiple adjustments to the position and the orientation of seat 44 to maximize comfort and control of vehicle 10. As can be appreciated, seat support 46 may alternatively comprise any one of a variety of well-known alternative seat support mechanisms which enable seat 44 to move relative to floor 56 of vehicle 10. For example, seat support 46 may alternatively only pivot about a single axis or alternatively may only translate frontward and rearward or sideways.

Armrest control unit 48 is fixedly secured to seat support 46 in a conventionally known manner so as to move with the movement of seat 44 relative to vehicle 10. Alternatively, armrest control unit 48 may be fixedly secured to seat 44 in a conventionally known manner so as to move with the movement of seat 44 relative to vehicle 10. In particular, rotation or translation of seat 44 relative to vehicle 10 also moves armrest control unit 48. Armrest control unit 48 preferably includes a plurality of electronic, operator-controllable command devices 58 which generate an electronic signal that is utilized to control a function associated with vehicle 10.

Armrest control unit 48 preferably comprises an armrest control unit as described and illustrated in co-pending U.S. patent application, Ser. No. 09/027,763, entitled "Control Lever Assembly", by inventors William L. Ostler, Hermann H. Regep, Darrel J. Svendsen, Patrick M. Lourigan, Ted W. Gregory and William L. Christopher (18483-214) filed on Feb. 23, 1998, (hereby incorporated by reference), except that armrest control unit 48 moves with seat 44. In particular, as best shown by FIG. 4, armrest control unit 48 includes throttle control 60 with bump switch 62, hitch up/down switch 64, hitch draft force potentiometer 66, hitch position control 68, creeper switch 70, mechanical front-wheel drive (MFD) switch 72, differential lock (DL) switch 74, power take-off (PTO) switch 76, hitch travel, drop speed and upper limit potentiometers 78–82, valve control levers 90–96, flow limit control knobs 108–116, kick-out timer set knob 118, and extend and retract limit switch 120 as set forth and described in greater detail in co-pending patent application Ser. No. 09/027,763, entitled "Control Lever Assembly", filed on Feb. 23, 1998, the high degree of integration of command devices 58 in armrest control unit 48 provides a convenient and inexpensive operator interface to the various control systems of vehicle 10. For example, an operator can fully control an auxiliary hydraulic system from a single console, and the expense and inconvenience associated with additional control panels are avoided.

As further shown by FIG. 4, command devices 58 are mounted to a console cover 122 of armrest control unit 48 for convenient operator access (kick-out timer disable switches are internal to armrest control unit 48 and, thus, are not visible). Alternatively, an operator control console configured differently from armrest control unit 48 can be used. Console cover 120 has two surface portions 123 and 124. A moveable cover 126 rotates about a hinge 128 to cover surface portion 124 and the command devices 58 mounted on second surface portion 124 (e.g., flow limit control knobs 108–116; limit switch 120). Cover 126 prevents accidental movement of the covered command devices, simplifies the interface presented to the operator during normal operation, and provides an armrest for the operator's comfort. In particular, armrest control unit 48 enables the operator to manipulate the majority of command devices 58 to adjust vehicle parameters with a single hand so that the operators other hand is free to operate the vehicle steering control 52. Armrest control unit 48 also enables the operator to control vehicle 10 as well as implement 12 while remaining seated upon seat 44. Moreover, because armrest control unit 48 moves with the movement of seat 44, the operator can easily and reliably access the controls of armrest control unit 48 regardless of the position of seat 44 such as when seat 44 is rotated to enable the operator to visually monitor the operation of implement 12.

Control and display unit 50 is described and set forth in greater detail in co-pending patent application Ser. No. 08/935,997 entitled "Seed Planter Performance Monitor" filed on Sep. 23, 1997. Control and display unit 50 is supported by support 46 for movement with seat 44 and armrest control unit 48. Control and display unit 50 is fixedly attached to an end of armrest control unit 48 such that movement of seat 44 also causes corresponding movement of armrest control unit 48 and control and display unit 50. As a result, control and display unit 50 enables an operator seated upon seat 44 to easily visually access the information upon control and display unit 50 while maintaining or only briefly interrupting visual contact with implement 12 pulled by vehicle 10.

Control and display unit 50 is illustrated in greater detail in FIG. 5. As best shown by FIG. 5, control and display unit 50 is an electronic control unit in communication with other electronic control units such as armrest control unit 48 via a vehicle database as illustrated and described in co-pending patent application Ser. No. 08/935,997. As set forth in co-pending patent application Ser. No. 08/935,997, control and display unit 50 is generally includes display unit 130 including a touch screen 132 (e.g., a TFT 10.4 inch (26.4 cm) color display with digital touch screen), system switches 134, reconfigurable switches 136 and system reset switch 138. A ½ VGA monochrome DMTN display with LED backlighting could also be used. Control and display unit 50 further includes interfaces 140–154 for implement bus 156, service tool 158, a remote keypad 160, a DGPS receiver 162, digital inputs (e.g., an in-cab remote switch 164), frequency inputs such as radar 166 and speed sensor 168, a memory card 170 and tractor bus 172. Control and display unit 50 also includes an audible alarm 174. A processor (e.g., ARM LH74610 RISC processor) coupled to memory circuits (e.g., RAM EEPROM Flash EPROM) provides control for control and display unit 50.

Control and display unit 50 can control different planting implement applications. An operator uses touch screen 132 to navigate and perform common functions within each application. System switches 134 include a MODE switch for toggling between applications, a CALIBRATE switch for performing configuration and calibration functions, and a UTILITY switch for performing file transfers on card 170. Switches 136 select between items on reconfigurable menus to control the operations of control and display unit 50. Reset switch 138 resets control and display unit 50. Remote keypad 160, mounted via a cable near the operator when control and display unit 50 is mounted elsewhere in the cab, duplicates switches 136. In-cab remote switch 164 allows the operator to remotely start and stop product metering. Alarm 174 is used to alert the operator to error and alarm conditions.

Both global and local operations or functions of implement 12 are controlled by actuations of switches 134 and 136. The global functions include lighting control (e.g., turning on and off lights attached to frame 26), frame control (e.g., raising and lowering frame 26; folding and unfolding wing sections 34) and marker control (e.g., alternately raising and lowering markers attached to both sides 42 of frame 26 to mark the centerline of the next pass). Actuations needed to control the global functions depend on the particular implement. When switch actuations relate to lighting, frame or marker control, control and display unit 50 generates global command signals which are communicated to a monitor interface unit (MIU), as described in U.S. patent application Ser. No. 08/935,997 and incorporated by reference, via bus 156 for controlling global output devices.

The local implement functions include variable-rate application of products to a field. Switches 134, 136 are actuated to control the rates in a manual or an automatic mode. In manual code, the actuations set, increase or decrease the desired application rates for one or more products applied by each section. In automatic mode, the actuations select between one or more prescription maps stored on card 170. The maps include geo-referenced data representing desired application rates of one or more products at positions throughout a field. Desired rates are determined, for example, off-line using a computer 150. The selected maps are indexed using positioning signals received by DGPS receiver 162 to determine the desired application rates which are then used to generate local product rate commands transmitted to multi-channel control units (MCCs), as described in greater detail in U.S. patent application Ser. No. 08/935,997, and incorporated by reference.

Although control and display unit 50 is illustrated as a relatively large liquid crystal display additionally including switches for controlling functions associated with vehicle 10, such as the operation of vehicle 10 or the operation of implement 12, control and display unit 50 may alternatively merely comprise a conventional display screen or monitor which only generates images for viewing by an operator located on seat 44. Furthermore, the configuration, location and type of control devices associated with control and display unit 50 will vary to a large extent depending upon the number and type of functions controlled by such control devices.

Figure 6:
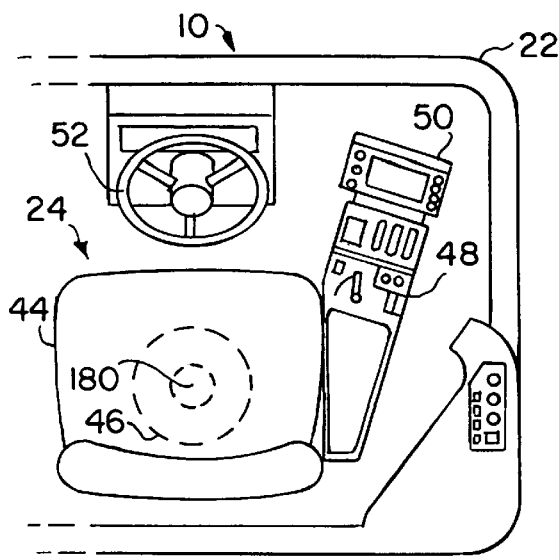
FIG. 6 is a top elevational view of the operator station of FIG. 3 illustrating the seat, armrest control unit, and control and display unit positioned in a forward-facing position.
Figure 7:
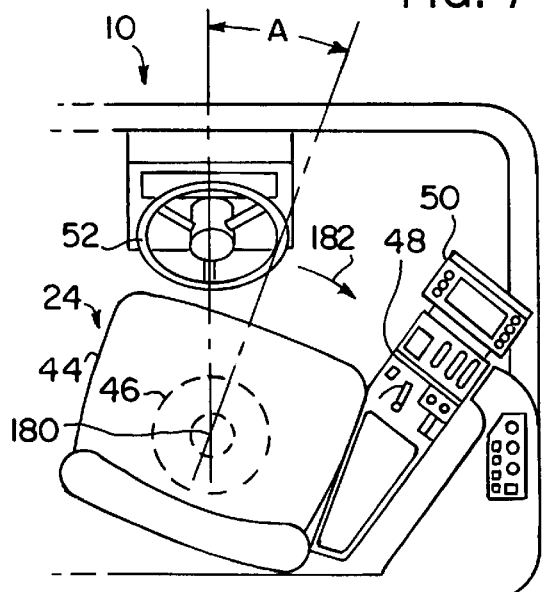
FIG. 7 is a top elevational view of the operator station of FIG. 6 illustrating the seat, armrest control unit, and control and display unit pivoted in a first direction.
Figure 8:
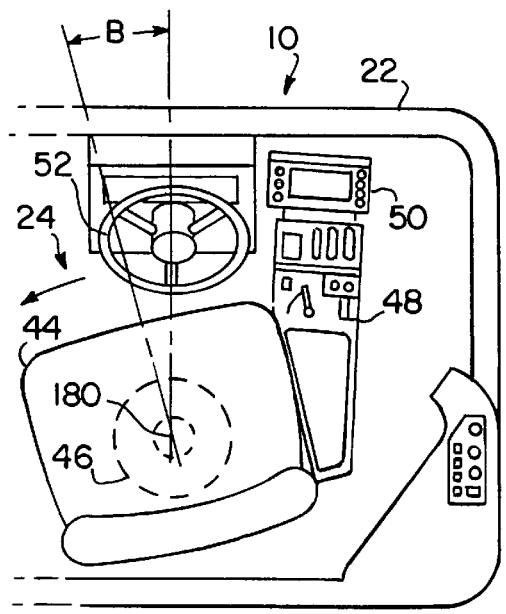
FIG. 8 is a top elevational view of the operator station of FIG. 6 with the seat, armrest control unit, and control and display unit pivoted in a second direction.

FIGS. 6–8 are top elevational views of operator station 24 illustrating seat 44, armrest control unit 48 and control and display unit 50 pivoted about vertical axis 180 by distance B, from a forward-facing position shown in FIG. 6 to the right and to the left as shown by FIGS. 7 and 8, respectively. As shown by FIGS. 6–8, seat 44 is rotatable about vertical axis 180 of support 46. Preferably, seat 44 is rotatable about vertical axis 180 of support 46 so as to rotate in a clockwise direction as indicated by arrow 182 by a distance A, at least the proximally 20°, as shown by FIG. 7 and in a counter-clockwise direction as indicated by arrow 182 by distance B, at least approximately 15°, as shown by FIG. 8. As further shown by FIGS. 6–8, as seat 44 rotates, armrest control unit 48 and control and display unit 50 also correspondingly rotate. As a result, when the operator swivels or pivots seat 44 to observe operations of vehicle 10 or implement 12 in a direction other than the forward direction of vehicle 10, the operator may maintain a relatively direct line of sight to control and display unit 50 as well as armrest control unit 48. In addition to maintaining visual access, the operator also has improved access to instrumentation and controls of both armrest control unit 48 and control and display unit 50 during movement of seat 44.

Figure 9:
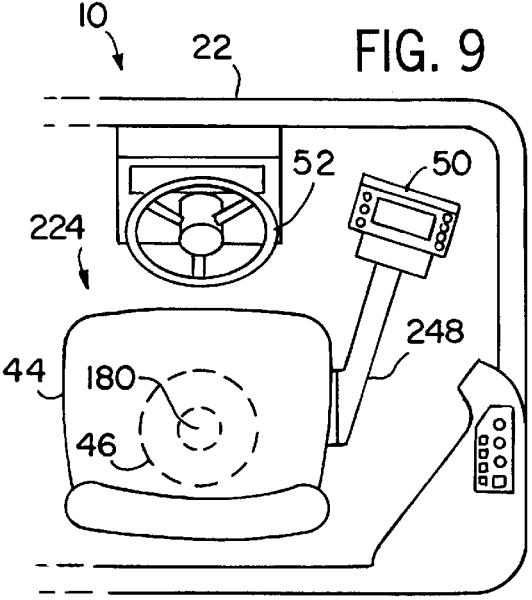
FIG. 9 is a top elevational view of an alternative embodiment of the operator station of FIG. 6.

FIG. 9 is a top elevational view of operator station 224, an alternative embodiment of operator station 24. Operator station 224 is similar to operator station 24 except that operator station 224 includes control and display unit support 248 in lieu of armrest control unit 48. For ease of illustration, those remaining elements of operator station 224 which correspond to similar elements of operator station 24 are numbered similarly. Control and display unit support 248 is a generally elongate arm extending between seat 44 and control and display unit 50. Support 248 preferably extends from a side of seat 44 and extends forwardly of seat 44 so as to support control and display unit 50 forward of seat 44 for viewing by an operator seated upon seat 44.

As with operator station 24, operator station 224 includes control and display unit 50 supported by support 46 for movement with seat 44. As a result, operator station 224 enables the operator to swivel or pivot seat 44 to view the operation of implement 12 from the rear or side of vehicle 10 or in a direction other than the forward direction of vehicle 10 while maintaining line of sight to control and display unit 50. In addition, operator station 224 enables the operator to maintain hand contact with the control devices of control and display unit 50 while pivoting or otherwise moving seat 44.

Although operator station 24 is illustrated as being embodied as part of a vehicle 10 comprising a tractor, operator station 24 may alternatively be employed with a variety of other vehicles, such as combines, excavators and the like, where the operator may be required to move the seat to monitor the vehicle or implements operably coupled to the vehicle while also monitoring the visual display of the operator station. Furthermore, the exact size, location, configuration and operation of operator station 24 will vary depending upon the type of vehicle in which operator station 24 is utilized. In addition, the direction and degree to which seat 44, armrest control unit 48 and control and display unit 50 rotate or otherwise move will also vary to a large extent depending upon the type of vehicle in which operator station 24 is utilized. In all cases, however, operator station 24 enables the operator to move seat 44 while maintaining a visual line of sight with the display coupled to seat 44.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. An operator station for a vehicle, the station comprising:
    an operator seat upon which an operator of the vehicle can be seated;
    a movement support attached to the operator seat and attachable to the vehicle to permit movement of the seat relative to the vehicle;
    at least one electronic, operator-controllable device supported by the support to move with the seat, wherein the device generates an electronic signal utilized to control a function associated with the vehicle; and
    an electronic display supported by the support to move with the seat, wherein the display is configured to generate images thereon for viewing by an operator located on the seat.

2. The station of claim 1, further comprising an armrest attached to the seat.

3. The station of claim 2, wherein the operator-controlled device is positioned at the armrest, and the seat and armrest attach the operator-controlled device to the support.

4. The station of claim 2, wherein the electronic display is positioned at the armrest, and the seat and armrest attach the electronic display to the support.

5. The station of claim 3, wherein the electronic display is positioned at the armrest, and the seat and armrest attach the electronic display to the support.

6. The station of claim 4, wherein the electronic display is a liquid crystal display having a viewing area of at least 2 square inches.

7. The station of claim 5, wherein the electronic display is a liquid crystal display having a viewing area of at least 2 square inches.

8. The station of claim 7, wherein the operator-controlled device is a potentiometer.

9. The station of claim 1, wherein the support comprises a pivot attached to the operator's seat and attachable to the vehicle to permit rotation of the seat relative to the vehicle such that the electronic display supported by the support rotates with the seat.

10. The operator station of claim 1, wherein the operator seat includes a back generally extending in a plane and wherein the electronic display faces the plane.

11. The operator station of claim 1, wherein the electronic display includes a screen extending above the at least one electronic, operator-controllable device.

12. The operator station of claim 1, including a console supporting the at least one electronic, operator-controllable device, wherein the console extends in a first plane and wherein the electronic display includes a screen extending in a second plane non-parallel to the first plane.

13. An operator station for a vehicle, the station comprising:
    an operator seat upon which an operator of the vehicle can be seated;
    pivot means for rotatably supporting the operator seat on the vehicle;
    control means for generating an electronic control signal utilized to control a function associated with the vehicle, the control means being supported on the vehicle by the pivot means; and
    display means for generating an image viewable by an operator located on the seat in response to an electronic display signal, the display means being supported on the vehicle by the pivot means.

14. The station of claim 13, further comprising an armrest attached to the seat.

15. The station of claim 14, wherein the control means is positioned at the armrest, and the seat and armrest attach the control means to the pivot means.

16. The station of claim 14, wherein the display means includes a liquid crystal display and is positioned at the armrest, and the seat and armrest attach the display means to the pivot means.

17. The station of claim 15, wherein the display means is positioned at the armrest, and the seat and armrest attach the display means to the pivot means.

18. The station of claim 17, wherein the display means is liquid crystal display having a viewing area of at least 2 square inches.

19. An off-road vehicle comprising:
    a vehicle frame;
    an operator station supported by the frame;
    an implement supported by the frame;

a transducer coupled to the implement to generate signals representative of at least one operating characteristic of the implement;

an actuator coupled to the implement and operable to control an operating parameter of the implement in response to a control signal;

an operator seat upon which an operator of the vehicle can be seated, wherein the seat includes at least one armrest attached thereto;

a pivot support attached between the operator seat and the frame to permit rotation of the seat relative to the vehicle;

at least one electronic, operator-controllable device supported by the armrest, wherein the device generates an electronic signal utilized to generate the control signal; and an electronic display supported at the armrest, wherein the display is configured to generate images thereon for viewing by an operator located on the seat.

20. The vehicle of claim 19, wherein the electronic display is a liquid crystal display having a viewing area of at least 2 square inches.

21. The vehicle of claim 19, further comprising a global positioning system supported by the frame to generate position signals representative of the location of the vehicle.

22. The vehicle of claim 21, further comprising a video display control circuit configured to generate display signals including information from the position signals, wherein the electronic display generates the images in response to the display signals.

23. The vehicle of claim 19, wherein the operator seat includes a back generally extending in a plane and wherein the electronic display faces the plane.

24. The vehicle of claim 19, wherein the electronic display includes a screen extending above the at least one electronic, operator-controllable device.

25. The vehicle of claim 19, including a console supporting the at least one electronic, operator-controllable device, wherein the console extends in a first plane and wherein the electronic display includes a screen extending in a second plane non-parallel to the first plane.

26. An operator station for a vehicle, the station comprising:

an operator seat upon which an operator of the vehicle can be seated;

a pivot support attached to the operator seat and attachable to the vehicle to permit rotation of the seat relative to the vehicle; and an electronic display supported by the pivot support to rotate with the seat, wherein the display is configured to generate images thereon for viewing by an operator located on the seat.

27. The station of claim 26, further comprising at least one electronic, operator-controllable device supported by the pivot support to rotate with the seat, wherein the device generates an electronic signal utilized to control a function associated with the vehicle.

28. The station of claim 27, further comprising an armrest attached to the seat, wherein the operator-controlled device is positioned at the armrest, and the seat and armrest attach the operator-controlled device to the pivot.

29. The station of claim 26, wherein the electronic display is positioned at the armrest, and the seat and armrest attach the electronic display to the pivot.

30. The station of claim 29, wherein the electronic display is a liquid crystal display having a viewing area of at least 2 square inches.

31. An operator station for a vehicle, the station comprising:

an operator seat upon which an operator of the vehicle can be seated;

a support attached to the seat and attachable to the vehicle to permit movement of the seat relative to the vehicle; and an electronic display supported by the support for movement with the seat, wherein the display is configured to generate images thereon for viewing by an operator located on the seat.

32. The station of claim 31, including an armrest attached to the seat.

33. The station of claim 32, wherein the electronic display is attached to the armrest.

34. The station of claim 31, wherein the support pivots about a vertical axis to permit rotation of the seat and the electronic display relative to the vehicle.

35. The operator station of claim 31, wherein the operator seat includes a back generally extending in a plane and wherein the electronic display faces the plane.

36. A vehicle implement system comprising:

an implement having an implement controller, whereby the implement controller generates an electronic signal utilized to control a function associated with the implement;

an off-road vehicle coupled to the implement to pull the implement, the off-road vehicle including:

an operator seat upon which an operator of the vehicle can be seated;

a movement support attached to the operator seat and attached to the vehicle to permit movement of the seat relative to the vehicle;

at least one electronic, operator-controllable device electrically coupled to the implement controller and supported by the support to move with the seat, wherein the device generates an electronic signal utilized by the implement controller to control a function associated with the implement; and an electronic display supported by the support to move with the seat, when the display is configured to generate images thereon for viewing by an operator located on the seat.

* * * * *